United States Patent [19]
Ruf

[11] Patent Number: 5,130,533
[45] Date of Patent: Jul. 14, 1992

[54] DEVICE FOR MEASURING BACKSCATTERED RADIATION USING A FREQUENCY SELECTIVE ELEMENT

[75] Inventor: Gerhard Ruf, Eichstätt, Fed. Rep. of Germany

[73] Assignee: Messerschmitt-Bölkow-Blohm GmbH, Fed. Rep. of Germany

[21] Appl. No.: 720,620

[22] Filed: Jun. 25, 1991

[30] Foreign Application Priority Data

Aug. 16, 1990 [DE] Fed. Rep. of Germany ....... 4025851

[51] Int. Cl.[5] ............................................... G01F 3/50
[52] U.S. Cl. .................................. 250/226; 219/121.62
[58] Field of Search ............... 250/226; 359/589, 634; 219/121.62, 121.78, 121.81, 235; 372/18, 20, 25

[56] References Cited

U.S. PATENT DOCUMENTS

| | | | |
|---|---|---|---|
| 3,781,700 | 12/1973 | Hansch et al | 372/25 |
| 3,836,263 | 9/1974 | Rickert | 356/251 |
| 3,902,130 | 8/1975 | Pike | 359/497 |
| 3,970,360 | 6/1976 | Kersten et al. | 385/130 |
| 4,181,898 | 1/1980 | McAllister | 372/20 |
| 4,400,056 | 8/1983 | Cielo | 359/900 |

FOREIGN PATENT DOCUMENTS

| | | |
|---|---|---|
| 3734144 | 3/1989 | Fed. Rep. of Germany . |
| 3739862 | 6/1989 | Fed. Rep. of Germany . |
| 2599287 | 5/1986 | France . |
| 1268482 | 3/1972 | United Kingdom . |

Primary Examiner—David C. Nelms
Assistant Examiner—S. Allen
Attorney, Agent, or Firm—Evenson, Wands, Edwards, Lenahan, & McKeown

[57] ABSTRACT

A device for measuring the radiation returned from a material treated by means of an optical radiation source can be inserted onto and removed from the beam path of the optical radiation source. An optical deflecting device guides the radiation of the optical radiaton source out of its beam path and subsequently guides it back onto the original beam path. The optical deflecting device has at least one element which reflects the radiation of the optical beam source and transmits the returned radiation, and a detector for detecting the returned radiaton being arranged behind the element.

4 Claims, 1 Drawing Sheet

DEVICE FOR MEASURING BACKSCATTERED RADIATION USING A FREQUENCY SELECTIVE ELEMENT

BACKGROUND OF THE INVENTION

The invention for measuring the radiation returned from a material irradiated by an optical radiation source, which device can be placed in the beam the optical radiation source.

The returned radiation generated when a material is irradiated, for example, by means of a laser, has a frequency which is sufficiently different from that of the laser radiation, to permit its measurement in a very simple manner. In particular, a frequency-selective beam splitter may be inserted into the beam path of the laser, which transmits the radiation of the laser, but reflects the returned radiation (German Pat. Document DE 37 26 466 A1). The returned radiation is coupled out of the beam path, and is then directed to a detector where its intensity is measured. The returned radiation (or the detector signal generated by it) provides information on the treated material, on the respective treatment state and the like.

When high-power radiation sources (high-power lasers) are used, however, it has been found that the transmission capacity of frequency-selective beam splitters is too low, which results in an unacceptable heating of the beam splitter and a weakening of the laser beam. For this reason, a complementary solution was suggested in which the laser radiation itself is reflected on a frequency-selective beam splitter having a reflection layer which is designed to be penetrable by the returned radiation (German Pat. Document 37 39 862 C2). However, this solution has the disadvantage that it changes the direction of the original beam path of the laser, and therefore cannot subsequently be built into or removed from an existing laser treatment device.

It is therefore an object of the present invention to provide a device for measuring the radiation returned by a material treated by an optical radiation, which is suitable for particularly high-power radiation and, if necessary, can also be inserted in existing optical treatment devices, or be removed from them.

The measuring device according to invention is based on the recognition that the reflectivity of frequency-selective beam splitters can be optimized to a greater degree by corresponding dielectric layers, than can their transmission behavior. However, a direct application of this principle conflicts with the demand for a measuring device which does not change the beam path of the laser, and which can be retrofitted and removed. Thus, the above mentioned object of the invention is achieved by means of a combination in which an optical deflecting device deflects the radiation of the optical radiation source out of its original beam path and subsequently guides it back to the same axis, and a frequency-selective element separates the returned radiation from that of the optical radiation source.

In order to achieve a particularly high efficiency, it is advantageous for the optical deflecting device to have elements which reflect only the radiation of the optical radiation source (for example, by means of total reflection). However, it is also possible to deflect the radiation of the optical radiation source through prisms and to provide, at a point of the deflected beam path, the frequency-selective beam splitter which is reflecting for the radiation of the optical radiation source and transmitting for the returned radiation. This should advantageously take place at a site very close to the treated material.

Other objects, advantages and novel features of the present invention will become apparent from the following detailed description of the invention when considered in conjunction with the accompanying drawings.

DETAILED DESCRIPTION OF THE DRAWINGS

Figure 1:
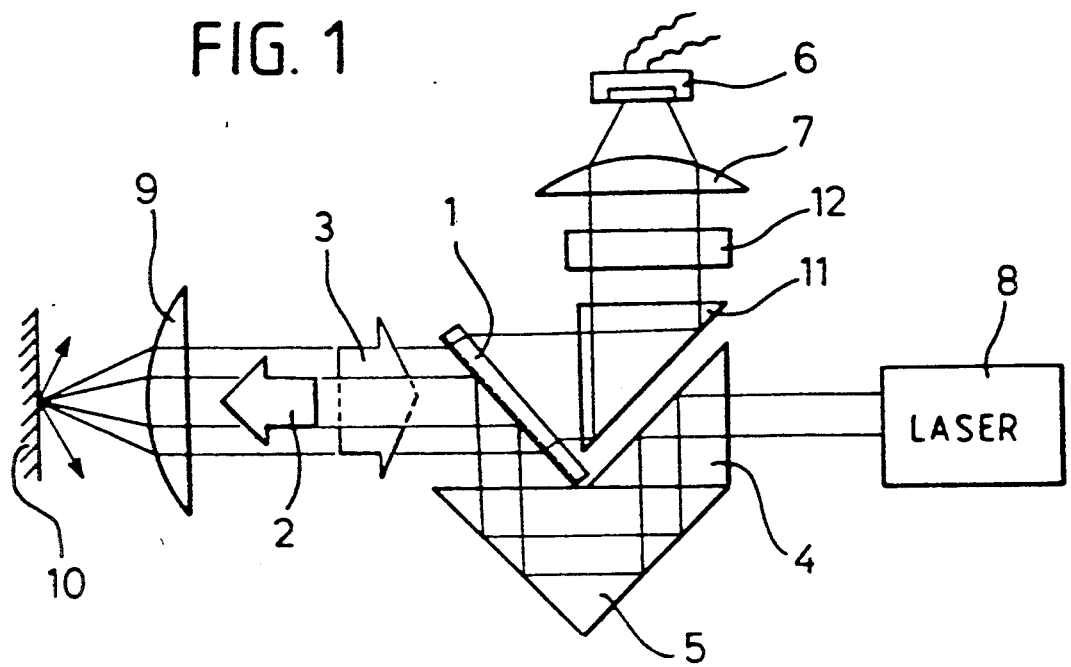
FIG. 1 is a view of a measuring device for returned radiation with a rectangular beam deflection.

In the embodiment illustrated in FIG. 1, the radiation 2 of a laser 8 is aimed by a focussing device at a material 10 to be treated. Alternatively, the radiation 2 may first be focussed by the focussing device 9 into an optical transmission path (for example, optical fiber) and may then be aimed at the material 10. Arranged between the laser 8 and the focussing device 9 is a deflecting device composed of elements 4, 5 and 1, which deflects the radiation 2 from its original optical axis and subsequently guides it back to this axis. The elements 4 and 5 are ridge prisms, at the base and roof surfaces of which the optical radiation 2 is reflected by 90° respectively. Element 1 is a partially reflecting mirror with a frequency-selective coating which reflects the radiation 2 of the laser 8 with an efficiency that is as high as possible, but transmits the radiation 3 returned by the material 10, which is in a different spectral region than the radiation 2, to be processed. The returned radiation 3, which may be further deflected through a prism 11 and weakened by means of a filter 12, is then focussed on a detector 6 by a lens system 7. The edge prisms 4 and 5 as well as the frequency-selective beam splitter 1 may be rigidly connected with one another so that the whole deflecting device is relatively insensitive to slight tilting in that the original beam 2 will then change only slightly in height. The complete deflecting and measuring device may be arranged in a housing provided with openings, so that it can be relatively easily inserted in or removed from an existing laser treatment device without requiring of major adjusting devices on the system.

Figure 2:
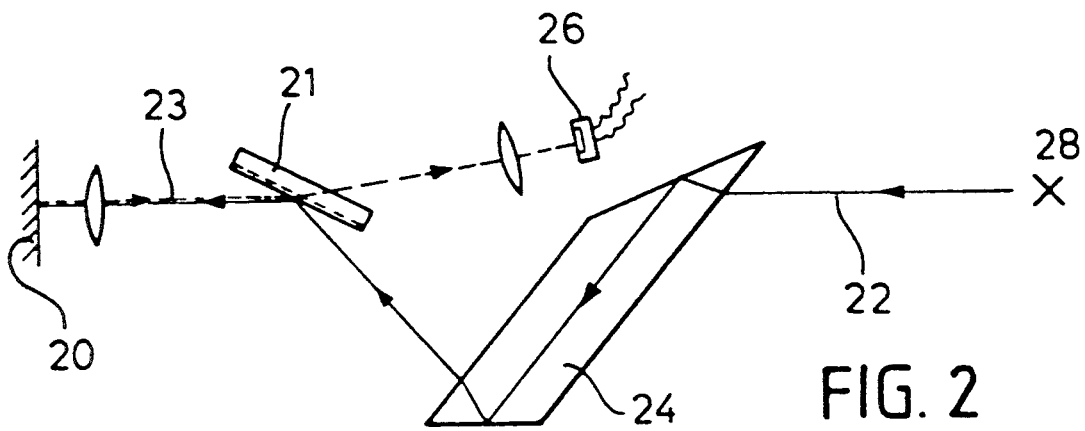
FIG. 2 is a view of a measuring device for returned radiation with only two optical, reflecting deflecting elements.

In the embodiment illustrated in FIG. 2, the radiation 22 of a laser 28 is not deflected rectangularly in a U-shape as in FIG. 1, but rather in a V-shape. This arrangement has the further advantage that only two optical elements are required: a rhomboid prism 24 and, a frequency-selective beam splitter 21 corresponding to FIG. 1. The radiation 23 returned by the irradiated material 20 is then guided to a detector 26 by the beam splitter 21.

Figure 3:
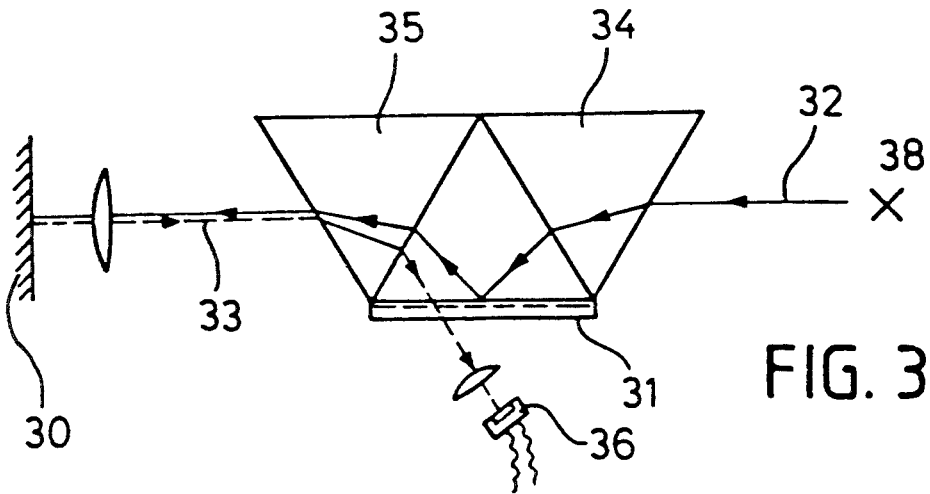
FIG. 3 is a measuring device for returned radiation with a deflecting device which has one reflecting and two diffractive optical elements.

In the embodiment illustrated in FIG. 3, the radiation 32 of a laser 38 is deflected also in a V-shape, by two prisms 34 and 35 arranged symmetrically adjacent one another as by well as a frequency-selective beam splitter 31. In this embodiment, the path of the radiation is also V-shaped, but symmetrical with respect to the beam splitter 31. Because of the prism 35, and as a result of dispersion the radiation 33 returned by the irradiated material 30 experiences a different deflection than the radiation 32 and, through the beam splitter 31, reaches a detector 36. In this arrangement, the radiation 32 is reflected only on the beam splitter 31; an optical refraction takes place on the remaining optical interfaces.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A device for measuring the radiation returned from a material irradiated by an optical radiation source, which device can be placed in the beam path of radiation from said optical radiation source, comprising an optical deflecting device adapted to deflect the radiation of the optical radiation source out of its beam path and to subsequently guide it back into the original beam path, said optical deflecting device having at least one frequency selective element which reflects said radiation of the optical radiation source and transmits returned radiation, and a detector for detecting the returned radiation said, detector being arranged behind the frequency selective element relative to a direction of propagation of said returned radiation.

2. A device according to claim 1, wherein the optical deflecting device has only such elements which reflect the radiation of the optical radiation source.

3. A device according to claim 1, wherein the optical deflecting device comprises two edge prisms and one frequency-selective beam splitter.

4. A device according to claim 1, wherein the optical deflecting device comprises a rhomboid prism and a frequency-selective beam splitter.

* * * * *